March 10, 1942.   W. J. MEANS ET AL   2,275,977
MEANS FOR CALIBRATING SCALES
Filed Sept. 28, 1938   2 Sheets-Sheet 1
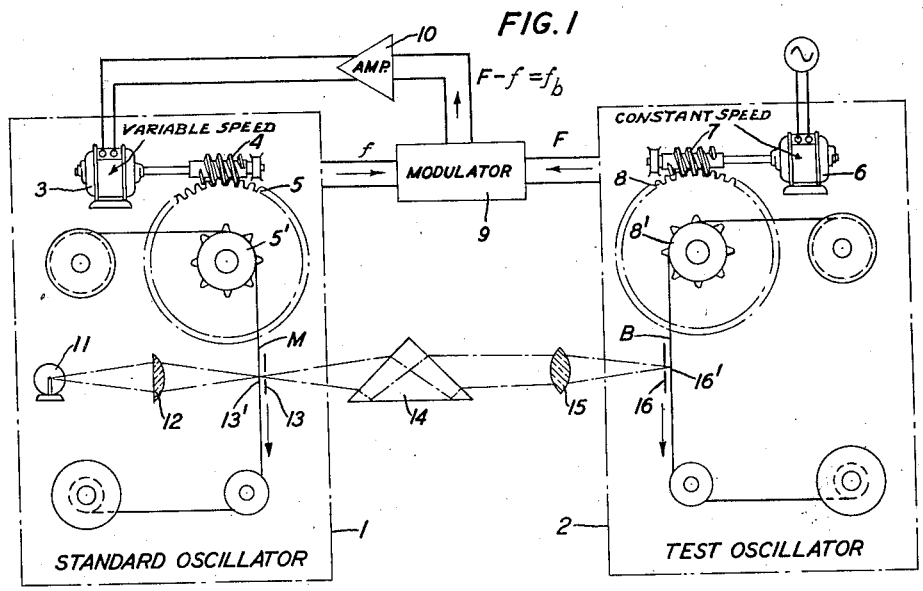
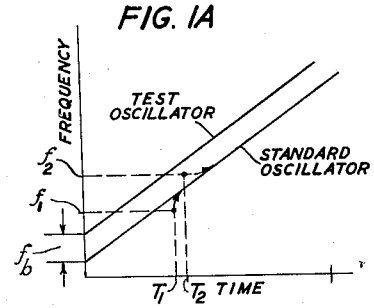
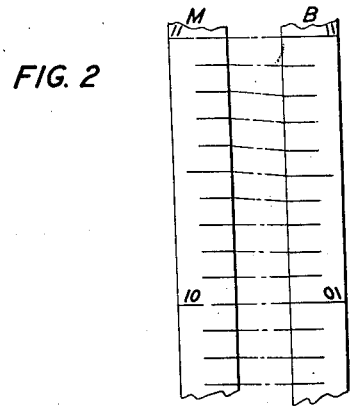
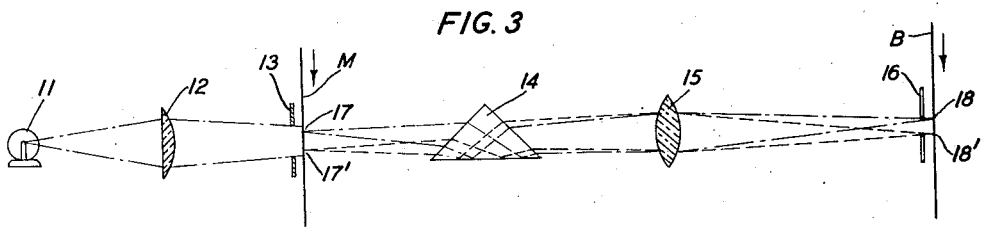
INVENTORS: W. J. MEANS
T. SLONCZEWSKI
BY
ATTORNEY

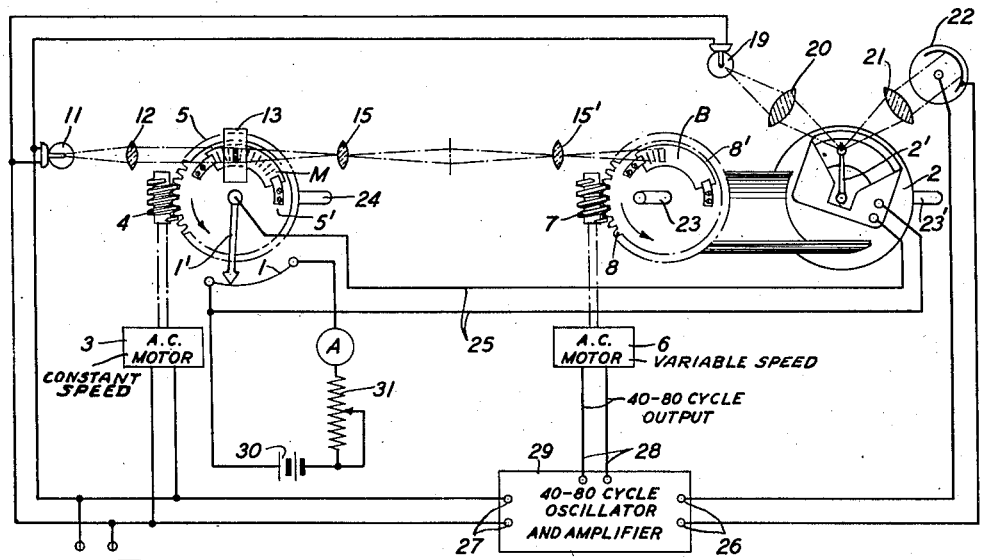

Patented Mar. 10, 1942

2,275,977

UNITED STATES PATENT OFFICE 2,275,977

MEANS FOR CALIBRATING SCALES

Winthrop J. Means, Ridgewood, N. J., and Thaddeus Slonczewski, New York, N. Y., assignors to Bell Telephone Laboratories, Incorporated, New York, N. Y., a corporation of New York Application September 28, 1938, Serial No. 232,068

8 Claims. (Cl. 73—151)

This invention relates to a system for automatically calibrating the scales of indicating instruments.

The object of this invention is to provide a means for automatically calibrating the scales of indicating instruments, such as oscillators, voltmeters, ammeters, variable impedances, pressure gauges, radio tuners and the like by continuous comparison with the master scale of a standard instrument.

Although in the design of indicating instruments attempts are made to make their response characteristics identical, experience has demonstrated that this is impossible particularly where precision is required. In such cases, it is necessary to resort to a separate calibration of each scale throughout its range.

Heretofore a careful calibration of such instruments has involved tedious manual comparison at a sufficiently large number of discrete points to enable reasonably accurate uniform subdivisions to be drawn therebetween. The amount of time consumed in manual calibration of such instruments ranges from a few hours for the simpler instruments to several days for the larger and more complicated scales, such as frequently required for heterodyne oscillators. Moreover, inaccuracies which readily creep into such laborious work are eliminated by automatic calibration as the master scales of the standard instruments can be very carefully checked and corrected throughout.

This invention attains the foregoing object by providing a means for automatically and continuously calibrating the scale of an indicating instrument comprising concurrently driving said scale and a standard scale throughout their common range and in substantial scale synchronism and continuously reproducing the master scale divisions on said scale.

The invention may be more fully understood by referring to the accompanying drawings, wherein:

Fig. 1 is a schematic arrangement disclosing the invention applied to the calibration of an electric oscillator having ribbon-like scales and employing an optical printing means;

Fig. 1A is a graph representing typical driving characteristics for the device of Fig. 1;

Fig. 2 is an enlarged view of portions of two scales from different but similarly constructed instruments with one scale inverted about a vertical axis to show a typical incongruity of characteristic;

Fig. 3 is a preferred form of optical printing means drawn to demonstrate the principle of continuously reproducing the master scale readings on a blank scale;

Fig. 4 is a schematic arrangement of an application of the invention to the calibration of a voltmeter;

Fig. 5 is a schematic arrangement showing the application of the invention to the calibration of electric impedance devices;

Fig. 5A is a modification of a part of Fig. 5; and

Fig. 6 is a schematic arrangement disclosing the invention applied to the calibration of a pressure gauge.

Referring now to Fig. 1 where the invention is illustrated by a specific application wherein a test oscillator 2 to be calibrated is so positioned with respect to a standard oscillator 1 that their respective indicating apertures 13 and 16 face each other. For purposes of calibration the height of these apertures along the direction of scale motion is made in the form of a relatively narrow slit as will be more fully discussed later. A scale driving means for each oscillator is provided comprising a motor 3, worm pinion 4 and worm gear 5 for the master scale M of the standard oscillator and a corresponding motor 6, worm pinion 7 and gear 8 for the blank scale B of the test oscillator. It will be understood that gears 5 and 8 control the frequency determining elements of their respective oscillators which are usually in the form of variable condensers. The drives are made to impart motion to their associated scales through sprocket wheels 5' and 8' in the direction of their respective arrows. The scales herein described are of the ribbon type similar to that disclosed in the U. S. patent to T. Slonczewski 2,058,641. However, they may both be of the disc type or one may be ribbon and the other disc. Either of the scales may be driven at substantially constant speed. In Fig. 1 the test oscillator is so driven by connecting motor 6 to a suitable alternating current source. Its scale B will then be driven at a substantially constant linear rate of speed but at a scale rate depending upon the frequency characteristic of its oscillator; that is to say, if the characteristic is exactly linear as to frequency, then the scale rate will be constant, but if the change in frequency per degree rotation is variable, the scale rate at any instant for constant angular velocity will be in direct proportion to the instantaneous rate of frequency change per degree rotation. As a practical matter, these instruments do not have a perfectly linear scale even when designed to be linear and for a long scale the error due to deviation from linearity frequently becomes cumulative.

Because of these inaccuracies duplicates of the master scale such as might be obtained by conventional contact printing would be badly in error and in most cases entirely without utility. To properly calibrate from a master scale it is essential to have both scales concurrently driven so as to always have their scale rates the same without regard to their angular or linear velocities. Moreover, provision must be made for starting and maintaining a fixed relative scale relationship between the two scales. Under the foregoing conditions, it is apparent that the angular or linear velocity of the standard oscillator of Fig. 1 must be variable so as to maintain at every instant the same scale velocity as that of the test oscillator and also to quickly correct any out-of-step condition which may have taken place. In Fig. 1 this is done by starting the calibration with the test oscillator at a higher frequency than the standard by an amount represented by the beat frequency $f_b$ which is derived in a well-known manner from modulator 9 and amplified by amplifier 10 to drive the standard oscillator motor 3.

In this connection it should be noted that it is possible to calibrate a scale which is adjusted to a fixed scale distance from the true value since the scale may after calibration be shifted to its true position without substantial error. For example, the scale of one of the oscillators may be offset a fixed scale amount, thereby maintaining a fixed frequency difference between them when the scales are maintained in scale synchronism. Due to the inherent structure of heterodyne oscillators this adjustment is made very simply by offsetting the frequency of the fixed frequency oscillator by the desired beat frequency $f_b$. It should also be noted that relatively small variations in beat frequency $f_b$ are necessary to drive the variable speed motor so that it will perform its function of maintaining a fixed relative scale rate. To reduce and maintain insignificant the errors caused thereby, the normal magnitude of the beat frequency $f_b$ is made as small as practicable, consistent with stability. After a long series of tests with precision oscillators this method has been found to be exceedingly practical and is employed in calibrating oscillators according to Fig. 1 so as to derive the beat frequency $f_b$ with the scales reading identical frequencies.

It will be observed from the above discussion that although the scales do not travel at the same linear or angular rate, they do maintain substantially the same scale rate. Since substantially the same scale positions are made to simultaneously appear at their respective apertures, it is possible to reproduce the master scale divisions at the properly distributed points along the blank scale of the uncalibrated oscillator. Many of the well-known printing means may be adaptable, the one selected depending partly upon the kind of scale to be printed and partly upon the choice of the designer. For example, the apertures may be placed very close together so that short time photographic contact printing may be employed in which case the scales should be driven in the same direction to avoid blurs. However, it is possible but less efficient to print with them running in opposite directions providing the light intensity is high enough and the apertures are made very narrow. Another method is to employ a standard scale carrying raised letters and divisions and print the blank scale with a fast drying printer's ink, the scales being so arranged as to contact with only a small elemental area which is relatively narrow in the direction of scale motion. The apparatus disclosed in Fig. 1, however, is preferred for oscillators and comprises a light source 11, a condenser lens 12, a translucent or transparent master scale M, an erecting prism 14, a converging lens 15, apertures 13 and 16 and a photosensitive blank scale B. Only one narrow aperture is necessary but two give a little better control of stray light which might fog the blank scale B. It should be noted that by reversing the front and back of the master scale M the erecting prism may be replaced by an inverting lens. Also, it has been found possible to arrange the standard oscillator so that its scale is inverted and running in the opposite direction in which case only one converging lens is needed. Moreover, as is well known in the optical art, master scale M may be opaque and light source 11 positioned in front so as to utilize reflected light although this method is less efficient. All of these printing means are to be regarded as equivalents and represent in substance means for continuously reproducing the master scale divisions; that is to say, the printing on the blank scale is done by a continuous, successive series of elements transverse to the direction of its travel. This will be more fully discussed in relation to Fig. 3.

Fig. 1A is a graphic representation of the driving characteristics of the motor drive of Fig. 1. It is here assumed for the sake of simplicity that both oscillators have linear scales which is not true in fact. However, the discussion is equally pertinent to non-linear scales. As represented, the test oscillator is started $f_b$ cycles ahead of the standard so as to produce the necessary beat frequency to drive the standard oscillator motor. It is obvious that so long as the oscillator frequencies remain a fixed frequency apart the standard oscillator motor will be driven at a constant speed. Should, however, for any reason, the standard oscillator get behind in frequency, for example, have a frequency of only $f_1$ cycles at time $T_1$ the beat frequency $f_b$ would be increased which would speed up the standard oscillator motor until the frequencies again are the proper amount apart. The converse is obviously true when the frequency of the standard becomes too high, for example, $f_2$ cycles at time $T_2$ as shown in Fig. 1A.

Fig. 2 shows enlarged portions of two ribbonlike scales such as may be used in the oscillators of Fig. 1, one form of which is more fully described in the above-mentioned Patent No. 2,058,641. This figure illustrates a typical non-cumulative incongruity between two scales, M which may be a master scale and B which may be a calibrated scale. Scale B has been reversed and dotted lines connect corresponding scale divisions for purposes of easy comparison. Over a longer length the difference might become cumulative and frequently is as large as one or more scale divisions.

Fig. 3 illustrates more in detail the effect of continuously and photographically reproducing the scale divisions. Assume at first that the linear speeds of the scales are in direct proportion to their distance from lens 15 so that the image at scale B of an object point on scale M will move synchronously with scale B; in such a case the width of the apertures is immaterial as a sharp image will be printed regardless of their width. For example, when the object is at point 17 on scale M the image is at point 18 on scale B. As the object moves to point 17' its image is moving synchronously with scale B to point 18'.

Now assume that the image is moving either faster or slower than photosensitive scale B; there will be a spread of the image along scale B but if the two scales are kept in mutual scale synchronism, its mean position will be at the proper place on scale B. The amount of spread can be reduced by making one or both of the apertures narrower. It is therefore seen that by such process each transverse element of the master scale continuously generates its image at the proper scale position rather than at proportional linear or angular distances along the blank scale. Moreover, it is evident that the same method and apparatus will also print between other types of scales, for example, two disc-type scales, between a ribbon-type and a disc-type scale or between either of these types and a drum-type scale.

In Fig. 4 the invention has been specifically applied to the calibration of a voltmeter but it is obvious to any one skilled in the art that it is not limited thereto. The only requirement is that where voltage is the quantity to be indicated the interconnecting control must be adapted to control voltage just as in Fig. 1 where frequency is to be the indicated quantity, the interconnecting control must be adapted to control frequency. Returning to Fig. 4 a standard voltage control 1 schematically shown in the form of a potentiometer is connected to the voltmeter under test 2 by means of conductors 25. The potentiometer voltage is adjusted to a predetermined standard value by means of rheostat 31 connected in series with voltage source 30 and ammeter A. The voltage source 30 is here shown as a direct current source but it may be alternating current if an alternating current instrument is to be calibrated.

Since voltmeters ordinarily have stationary scales with movable pointers it is necessary to so mount the instrument that the scale may be driven and the pointer remain stationary. This is done by mounting the meter 2 on a support rotatable on shaft 23, 23' and integral with driven gear 8 as was done for the ribbon-type scale in Fig. 1. For convenience in printing, the blank scale B is mounted apart from its instrument on another portion 8' of the same rotatable support integral with gear 8. While only one stationary aperture 13 is shown another aperture may be placed over scale B in the same manner as aperture 16 in Fig. 1.

The optical system is substantially equivalent to that of Fig. 1, the erecting prism 14 here being replaced by a second converging lens 15'. The prism could be substituted by merely reversing the figures from front to back on master scale M in a well-known manner. The master scale divisions are continuously reproduced at their proper places along the blank scale as above described for Fig. 1.

As in Fig. 1 either of the motors may be driven at substantially constant speed. In Fig. 4 motor 3 is so driven while the speed of motor 6 is made variable. While other speed controls may be used, one of which will be described in relation to Fig. 6, the one here selected for illustrative purposes utilizes a photoelectrically controlled oscillator and amplifier 29. Oscillators of this type are well known and the particular form is immaterial just so its frequency can be photoelectrically controlled to drive motor 6 over a sufficient speed range above and below the steady speed of motor 3 to maintain scale B in substantial scale synchronism with scale M. Two such oscillators are represented by U. S. Patent 1,379,166 to T. W. Case and U. S. Patent 2,115,917 to R. B. Shanck. Another type of photoelectric control adaptable to this art while not employing an oscillator is represented by U. S. Re. Patent 17,221 to C. F. Jenkins. The specific control disclosed in Fig. 4 comprises a light source 19, the emission therefrom being focussed by lens 20 into a small circle on the instrument frame directly under the normally stationary pointer position. Should the particular instrument frame be inadaptable for this purpose, a dummy blank scale card may be placed thereon to provide the necessary reflection. Another lens 21 is focussed on the plane of the pointer 2' and transmits the reflected light from the spot thereunder to light sensitive cell 22 which is connected to the control terminals 26 of the oscillator 29. The adjustment is such that at the start pointer 2' totally intercepts the light to cell 22 whereupon the oscillator frequency is made low, say 40 cycles, for example. Scale M will then tend to advance slightly ahead of scale B so that pointer 2' moves clockwise more rapidly than its meter 2 carries it counterclockwise because motor 6 is driven from the output 28 of oscillator 29. The net result is that pointer 2' gradually admits more light to cell 22 whereupon the frequency of oscillator 29 is increased in proportion and consequently the speed of motor 6. A balance will be established wherein pointer 2' remains substantially stationary and only partly eclipsing the light to cell 22. Oscillator 29 is supplied by connecting a suitable alternating current source to terminals 27.

In Fig. 5 a device for calibrating a variable impedance is disclosed. For simplicity the scales and optical systems, which may be any suitable combination of those previously described, have been omitted. The printing means may be photographic or any of the other well-known types, although photographic means is preferred because it is frictionless. The specific disclosure is of a variable capacitor but it may equally be of an inductometer or by suitably changing the control as previously discussed may be a potentiometer or rheostat. The uncalibrated variable impedances may be secondary standards or may be the tuning elements of a radio set, or if the radio is of the heterodyne type the control of Fig. 1 would be adaptable. The specific control principle herein disclosed comprises an oscillator 32 adapted to produce in modulator 34 a beat frequency with reference oscillator 33, the frequency thereof being determined by the network impedance of condensers M and B associated with the master and blank scales respectively. These two impedances are so driven that their network impedance tends to remain substantially constant, hence the beat frequency $f_b$ driving motor 6 is also kept substantially constant. If the capacity of condenser B falls off too rapidly the network capacity becomes less and the beat frequency less according to well-known laws. Therefore, condenser B will rapidly slow down relative to condenser M to maintain scale synchronism between them. It will be understood that the master scale of condenser M must be reversed from its normal position so that its scale always reads the capacity scale B must read to keep the network capacity constant.

If inductometers are to be calibrated interconnecting control wires 35 are used to connect the master and test inductometers in series, the operation thereof being thereafter the same as for the capacitors. This is more clearly shown by Fig. 5A which may be substituted for that part of Fig. 5 cut away at line x—x.

Fig. 6 shows the invention applied to calibrating a pressure gauge. While the scales are shown separated they are actually run closely parallel with stationary aperture 16 therebetween. This may be done by sliding a shaft extension 23 into the hollow end of shaft 24. Reproduction is effected as before but without the use of lenses or prisms. Of course, an optical lens system could be used as in any of the equivalent forms heretofore described. The master scale M in this instance indicates the pressure of the fluid, preferably oil, in cylinder 43, as measured by the standard gauge 1. Cylinder 43 is connected to the test gauge 2 by means of pipe line 54, stopcock 55 and flexible pipe 56. Measuring spring 41 is interposed between stationary frame 44 and piston 40 and has thrust bearings 45 and 46 at the ends thereof to reduce turning friction incident upon flexure. Piston 40 is driven upwardly at substantially constant speed by oil pumped from chamber 42 through gear pump 35 which is in turn driven by a compound wound direct current motor 3. A relatively large by-pass pipe 38, shunts pipes 36 and 37 and when valve 39 inserted therein is open the pressure in cylinder 43 is practically zero. Stop-cock 55 is closed only when changing gauges. Cable 47 connects the master scale driving means 5 to piston 40, so that as the pressure is increased counterweight W is permitted to lower thereby rotating shaft 24, scale support 5' and with it master scale M. As in Fig. 4 so here in Fig. 6 pointer 2' is kept substantially stationary while its instrument 2 and scale B move. Gear 8, associated with scale support 8', is driven by shunt wound motor 6, the speed of which is controlled in this instance by rheostat 51. Adjustable contact 48 is adjusted before starting so at zero pressure it just breaks contact with pointer 2'. Slider 53 of rheostat 51 is adjusted to cause motor 6 to drive blank scale B slightly faster than the substantially constant speed of the master scale M. Slider 52 is so adjusted with relay contact 50 closed as to cause motor 6 to run scale B slower than scale M. Vacuum tube relay 49 is adapted to close relay contact 50 whenever pointer 2' grounds contact 48 through shaft 23'. With valve 39 closed main switch 57 is closed which starts both motors. While contact 48 is ungrounded scale B and gauge 2 will travel more rapidly than pointer 2' with the result that pointer 2' touches contact 48 whereupon motor 6 is slowed down. A state of substantial synchronism between the scales is thereby attained throughout the calibration.

Although throughout the various figures specific interconnected synchronous driving and control means have been shown, it is obvious that many others may be used, as numerous suitable control means are well known and readily suggest themselves to anyone skilled in this art.

It should be noted that in the foregoing description of each of the figures shown in the drawings the instrument, whether standard or uncalibrated, has some form of mechanism with a variable element, each arbitrary position whereof corresponds to or represents a particular magnitude of the condition to which the instrument is related. Thus for the oscillators of Fig. 1, each arbitrary position of sprocket 5' or 8' represents a definite frequency condition. Also in Fig. 4 each arbitrary position of pointer 1' or 2' represents a particular voltage condition. Again in Fig. 6, each arbitrary position of piston 40 or pointer 2' represents a definite pressure condition. In each case the indicia of the master scale accurately indicate the magnitude of the condition represented by the standard instrument and the interconnected control means maintains both instruments in scale synchronism, that is, it automatically makes both instruments simultaneously represent equal magnitudes of the condition whatever its character may be.

What is claimed is:

1. In a system for calibrating an instrument having a blank scale, the combination comprising a standard instrument including a master scale adapted to accurately indicate the condition represented by said standard instrument, means for varying the magnitude of the condition represented by one of said instruments, means interconnecting said instruments and under control of said one instrument for causing the other instrument to represent a condition of corresponding magnitude whereby the magnitude of the condition represented by both instruments is indicated by the master scale of the standard instrument, and means for continuously reproducing the indicated master scale readings on the blank scale.

2. In a system for calibrating an instrument having a blank scale, the combination comprising an actinically responsive surface for the blank scale, a standard instrument including a master scale inscribed with indicia to accurately indicate the magnitude of a condition represented by said standard instrument, means for varying the magnitude of the condition represented by one of said instruments, means interconnecting said instruments and under control of said one instrument for causing the other instrument to represent a condition of corresponding magnitude whereby the magnitude of the condition represented by both instruments is indicated by the master scale, and an actinic means for continuously reproducing the indicated master scale indicia at their properly distributed places on the blank scale.

3. In a system for calibrating an oscillator having a blank scale, comprising the combination of a standard oscillator including a master scale having indicia adapted to accurately indicate the frequency represented by said standard oscillator, means for varying the frequency represented by one of said oscillators, means interconnecting both oscillators for causing the other oscillator to simultaneously represent a substantially equal frequency whereby the master scale continuously indicates the magnitude of the varying frequency represented by both oscillators, and means for continuously reproducing the indicated master scale indicia at their properly distributed places on the blank scale.

4. In a system for calibrating an oscillator having a blank scale, comprising the combination of an actinically responsive surface for the blank scale, a standard oscillator including a master scale having indicia adapted to accurately indicate the frequency represented by said standard oscillator, means for varying the frequency represented by one of said oscillators, means interconnecting both oscillators for causing the other oscillator to simultaneously represent a substantially equal frequency whereby the master scale continuously indicates the magnitude of the varying frequency represented by both oscillators, and an actinic means for continuously reproducing the indicated master scale indicia at their properly distributed places on the blank scale.

5. In a system for calibrating a variable capacitor having a blank scale, the combination comprising a standard variable capacitor, a master scale therefor, the indicia whereof are arranged in reverse order and calibrated to indicate a capacitance value equal to the difference between a predetermined constant value and the actual instantaneous capacitance of the standard, means for varying the magnitude of one of the variable capacitors, means interconnecting said capacitors for maintaining their sum substantially equal to said predetermined constant value whereby the capacitance of the uncalibrated capacitor is indicated by the master scale and means for continuously reproducing the indicated master scale readings on the blank scale.

6. In a system for calibrating a variable inductor having a blank scale, the combination comprising a standard variable inductor, a master scale therefor, the indicia whereof are arranged in reverse order and calibrated to indicate an inductance value equal to the difference between a predetermined constant value and the actual instantaneous inductance of the standard, means for varying the magnitude of one of the variable inductors, means interconnecting said inductors for maintaining their sum substantially equal to said predetermined constant value whereby the inductance of the uncalibrated inductor is indicated by the master scale and means for continuously reproducing the indicated master scale readings on the blank scale.

7. The combination of claim 5 wherein the means for continuously reproducing the indicated master scale readings on the blank scale is an actinic means.

8. The combination of claim 6 wherein the means for continuously reproducing the indicated master scale readings on the blank scale is an actinic means.

WINTHROP J. MEANS.
THADDEUS SLONCZEWSKI.